(12) United States Patent
Tatah

(10) Patent No.: US 6,591,042 B2
(45) Date of Patent: Jul. 8, 2003

(54) FIBER BASED WAVELENGTH DE-MULTIPLEXING SYSTEM

(75) Inventor: Karim Tatah, Winchester, MA (US)

(73) Assignee: Schott Optovance, Inc., Southbridge, MA (US)

( * ) Notice: Subject to any disclaimer, the term of this patent is extended or adjusted under 35 U.S.C. 154(b) by 0 days.

(21) Appl. No.: 10/040,514

(22) Filed: Dec. 28, 2001

(65) Prior Publication Data

US 2003/0068133 A1 Apr. 10, 2003

Related U.S. Application Data

(60) Provisional application No. 60/328,215, filed on Oct. 10, 2001.

(51) Int. Cl.$^7$ ................................................. G02B 6/42
(52) U.S. Cl. ........................... 385/43; 385/24; 385/37; 385/10; 359/115; 359/124; 359/127
(58) Field of Search ........................ 385/43, 24, 37, 385/10, 27, 39, 14, 15, 31; 359/124, 127, 115, 122, 130

(56) References Cited

U.S. PATENT DOCUMENTS

| 4,257,673 A | 3/1981 | Matthijsse |
| 4,305,641 A | 12/1981 | Witte |
| 4,911,516 A | 3/1990 | Palfrey et al. |
| 5,170,451 A | 12/1992 | Ohshima ..................... 385/43 |
| 5,570,442 A | 10/1996 | Arii et al. ..................... 385/46 |
| 6,094,517 A | 7/2000 | Yuuki .......................... 385/43 |

OTHER PUBLICATIONS

Lucent AWG Mux/DeMux Advertisement, undated. (Admitted Prior Art).

*Primary Examiner*—Phan T. H. Palmer
(74) *Attorney, Agent, or Firm*—Volpe and Koenig, P.C.

(57) ABSTRACT

A de-multiplexing system for optical signals including an optical fiber attached to an optical fiber taper is provided. Optical signals are transmitted through the optical fiber to the optical fiber taper. An etched diffraction grating located at the end of the optical fiber taper de-multiplexes optical signals. Bi-directional de-multiplexing can be accomplished by providing optical fiber tapers with etched diffraction gratings at both ends of the optical transmission fiber. A GRIN lens can be provided for focusing the de-multiplexed signals onto specific optical detectors.

12 Claims, 2 Drawing Sheets

FIBER BASED WAVELENGTH DE-MULTIPLEXING SYSTEM

BACKGROUND

The present invention involves a system for transmitting optical signals. More particularly, the invention relates to a system for de-multiplexing signals transmitted through optical fibers between optical signal emitters and detectors.

The use of optical fibers for optical signal transmission allows for near instantaneous communications between signal emitters and detectors. In order to increase data transmission rates, it is possible to simultaneously transmit multiple optical signals over the same optic fiber line. The signals are generated or modulated to different wavelengths and transmitted together into the optic fiber line in a process called multiplexing. As a consequence of multiplexing, a step of de-multiplexing is required to segregate the transmitted signals from one another.

Several types of devices have historically been used to de-multiplex optical signals. Physical box type filters or wafer type diffraction gratings are placed at the end of optical fibers in order to de-multiplex the signals. These devices, however, have certain limitations. The use of individual couplers for linear array waveguides require considerable time to install on the ends of individual fibers or fiber bundles. Further still, couplers can only be constructed to a certain minimum size and therefore have inherent size drawbacks. As de-multiplexing systems increase in complexity due to higher volumes of signals being carried, the physical size of an installed unit becomes larger, thus requiring additional space. The drawbacks of the prior known conventional technologies for use in fiber optics include signal losses and time in installing physical devices. It would be desirable to provide improvements to the process of de-multiplexing in order to eliminate the drawbacks with the known systems and to reduce cost.

SUMMARY

The present invention provides an optical fiber based wavelength de-multiplexing system. The fiber based wavelength de-multiplexing system has the capability of receiving multiplexed optical signals from signal emitters and de-multiplexing them through an etched diffraction grating. The system includes an optical fiber taper with an etched diffraction grating located on the larger diameter end. The smaller diameter end of the optical fiber taper is optically connected to a transmission fiber. Optical signals, generated by an optical signal emitter, enter the transmission fiber and are transmitted through the transmission fiber to the optical fiber taper. The transmitted signals enter the smaller diameter end of the optical fiber taper and are transmitted to the larger end of the taper. The transmitted signals are de-multiplexed based on wavelength by the etched diffraction grating on the optical fiber taper.

In another aspect, the invention provides a wavelength de-multiplexing system in which optical fiber tapers are optically connected to each end of an optical fiber. The larger diameter end of each optical fiber taper has an etched diffraction grating. Optical signals generated by a signal emitter are multiplexed and transmitted through the optical fiber tapers and the transmission fiber in each direction. The optical signals are then de-multiplexed through the etched diffraction grating on the ends of the optical fiber tapers.

In another aspect, the invention also provides a method of performing bi-directional de-multiplexing. The method entails providing a first and second optical fiber taper. A transmission fiber is optically connected to the smaller diameter ends of the optical fiber tapers. The two larger diameter ends of the optical fiber taper have etched diffraction gratings located thereon. Optical signals are generated by an optical signal emitter, and are multiplexed and transmitted through the first optical fiber taper and through the length of the first optical fiber taper. The multiplexed signals are then transmitted through the second taper to the etched diffraction grating. The signals are de-multiplexed by the etched diffraction grating. As a result of having two etched diffraction grating ends, signals may be de-multiplexed in either direction, allowing for bi-directional optical communication between the ends of the tapers.

BRIEF DESCRIPTION OF THE DRAWINGS

The foregoing summary, as well as the following detailed description of the preferred embodiments of the invention will be better understood when read in conjunction with the appended drawings. For the purpose of illustrating the invention, presently preferred embodiments are shown in the drawings. It should be understood, however, that the invention is not limited to the precise arrangements shown.

DETAILED DESCRIPTION OF THE PREFERRED EMBODIMENTS

Figure 1:
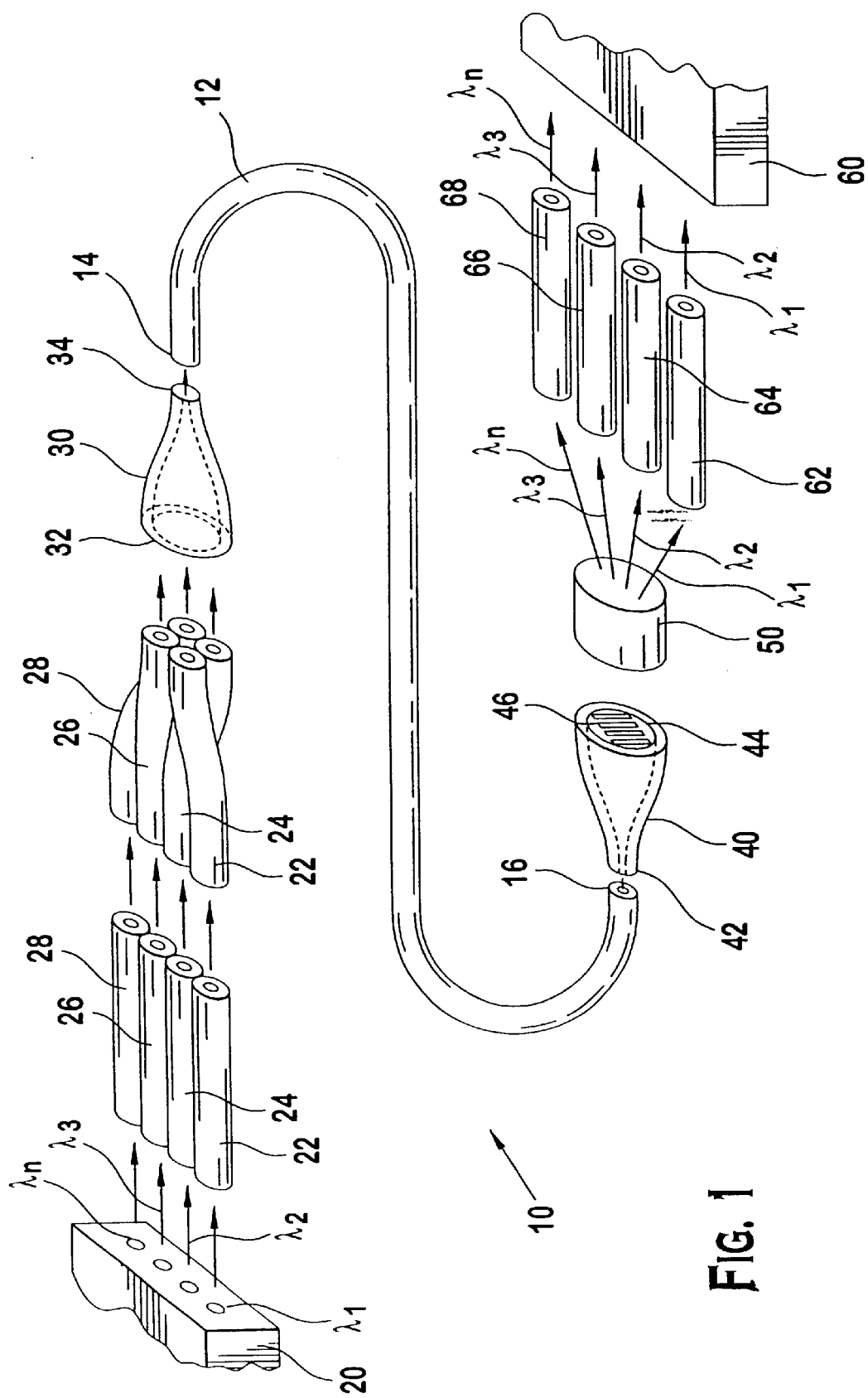
FIG. 1 shows a single direction de-multiplexing system with an optional optically connected GRIN lens.

Referring now to FIG. 1, a fiber based wavelength de-multiplexing system 10 in accordance with a first preferred embodiment of the present invention is shown. The fiber based wavelength de-multiplexing system 10 includes an optical fiber transmission line 12 having first and second ends 14, 16. The first end 14 is adapted to receive multiplexed signals. The signals are preferably provided by an optical signal transmitting source array 20, which may be an array of vertical cavity surface emitting lasers (VCSCL's) or an array of light emitting diodes (LED). The emitters may be arranged in a 1×n array or in an m×n array, depending upon the number and type of optical signals being transmitted. In the embodiment of the system 10 shown in FIG. 1, a 1×n array where n=4 is shown. However, it will be recognized by those skilled in the art that other arrangements could also be provided and the number of signal emitters could be varied, depending upon the volume of data being optically transmitted.

In FIG. 1, the optical signals are represented by arrows $\lambda_1$–$\lambda_n$, with each emitter transmitting an optical signal on a different wavelength. The signals from the emitter array 20 are transmitted into the first end 14 of the optic fiber 12. In the illustrated embodiment, this is accomplished via transmitting the signals $\lambda_1$, $\lambda_2$, $\lambda_3$, $\lambda_n$ through optic fibers 22, 24, 26, 28 which can be rearranged into a more compact generally circular arrangement prior to entering a taper 30 through which they are transmitted into the first end 14 of the optical fiber 12. These signals $\lambda_1$–$\lambda_n$ are generated, multiplexed, and enter into the optical fiber 12. While the taper 30 is used in the first preferred embodiment of the system 10 for directing the signals $\lambda_1$–$\lambda_n$ into the optical fiber 12, those skilled in the art will recognize that other types of optics, such as a lens could be utilized to focus the signals into the first end 14 of the optic fiber 12.

An optical fiber taper 40 with a first end 42 and a second end 44 is provided at the second end 16 of the optical fiber 12. The first end 42 of the optical fiber taper 40 has a smaller area than the area of the second end 44 of the optical fiber taper 40. In a preferred embodiment, the ratio of areas of the first end to second end is approximately 1:10 to provide a ten times (10×) magnification of the multiplexed signals transmitted through the optic fiber 12. The second end 16 of the optic fiber 12 is optically connected to the first end 42 of the tapered optical fiber 40. This is preferably done with an optically transmissive adhesive, such as a clear epoxy adhesive. An etched defraction grating 46 is located on a second end 44 of the optical fiber taper 40. The defraction grating de-multiplexes optical signals $\lambda_1$–$\lambda_n$ transmitted through the optical fiber 12 such that the different wavelength signals are separated by wavelength and focused in different areas. In a preferred embodiment, a GRIN lens 50 is optically connected to the second end 44 of the optical fiber taper 40 to transmit the de-multiplexed optical signals $\lambda_1$–$\lambda_n$ from the etched defraction grating 46 to an array of detectors 60, which are preferably optical pulse photo detectors of a type known to those skilled in the art. The GRIN lens 50 may directly focus the optical signals $\lambda_1$–$\lambda_n$ onto each detector of the detector array 60. Alternatively, the signals may be focused onto separate optical fibers 62, 64, 66, 68 which are connected to the detectors of the detector array 60.

Figure 2:
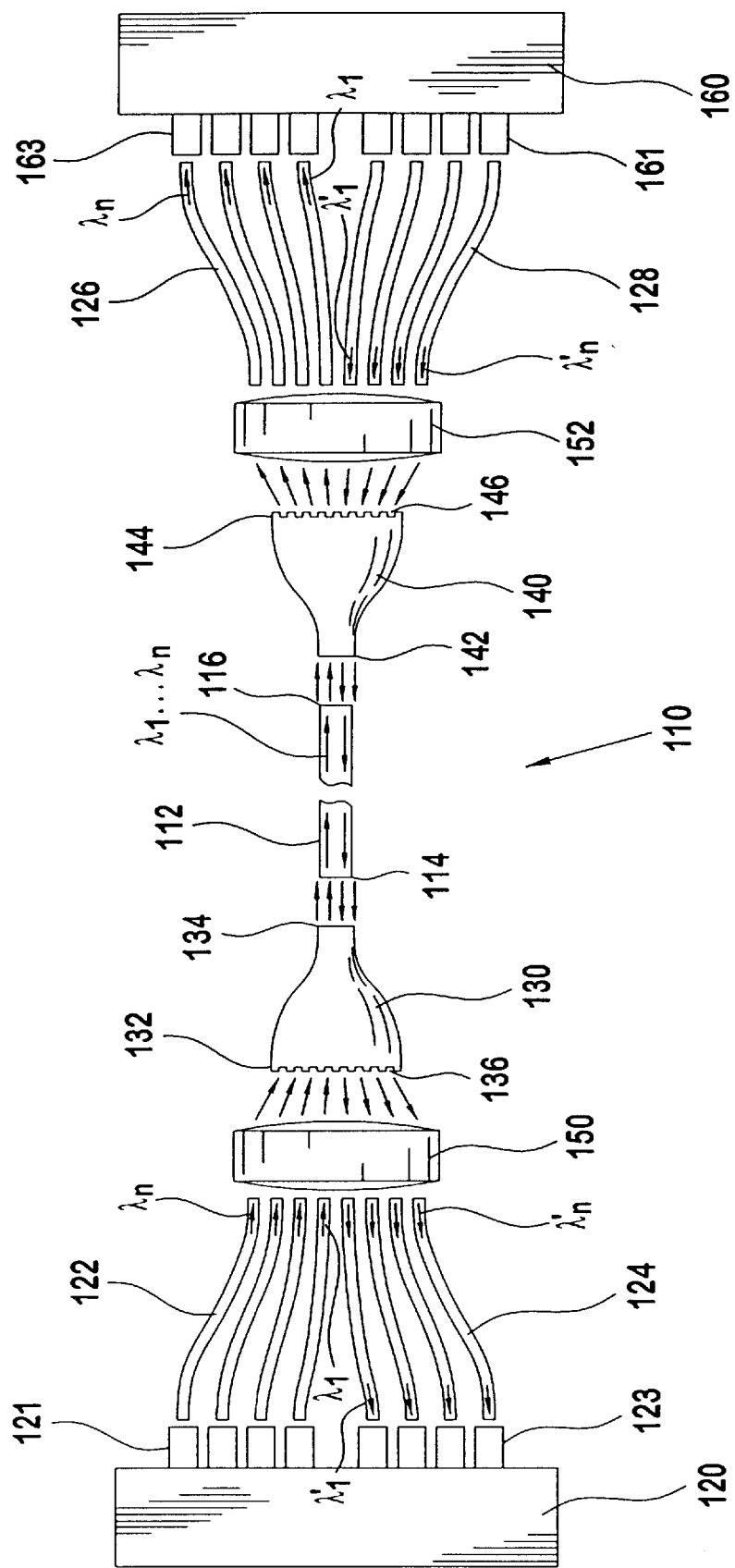
FIG. 2 shows a bi-directional de-multiplexing system with optically connected GRIN lenses and a plurality of fibers at each end of the de-multiplexing system.

Referring now to FIG. 2, a second embodiment of a fiber based wavelength de-multiplexing system 110 is shown. The system 10 of the second embodiment of the invention is similar to the system 10 of the first embodiment. The second embodiment of the wavelength de-multiplexing system 110, however, is adapted for bi-directional multiplexing and de-multiplexing of optical signals transmitted over a single optical fiber 112 between first and second opto-electronic devices 120 and 160. The opto-electronic devices 120 and 160 each include a plurality of optical emitters 121, 161 and optical signal detectors 123, 163. The optical signals are emitted at different wavelengths by the emitters 121 of the opto-electronic device 120, similar to the wavelengths $\lambda_1$–$\lambda_n$ as described above in connection with the first embodiment. The emitters 161 of the second opto-electronic device 160 also emit optical signals at different wave lengths $\lambda'_1$–$\lambda'_n$. The emitters and detectors 121, 161, 123, 163 are preferably arranged in m×n arrays where m and n are integers. In the illustrated embodiment, the emitter and detector arrays 121, 161, 123, 163 are 1×4 arrays. However, those skilled in the art will recognize from the present disclosure that the size of the arrays can be varied, and that the arrays need not be arranged in direct linear fashion but could be arranged in any desired configuration.

A first optical fiber taper 130 having a first end 132 and a second end 134 is provided, with the first end 132 having an area greater than the second end 134. Preferably, the first end has an area which is approximately 10 times greater than the area of the second end 134. A first etched diffraction grating 136 is located on the first end 132 of the first optical fiber taper 130. The first optical fiber taper 130 is adapted to transmit optical data signals $\lambda_1$–$\lambda_n$, which are transmitted at different wavelengths from the emitters 121 of the first opto-electronic device 120, into the transmission fiber 112. The etched diffraction grating 136 located on the first end 132 is adapted to de-multiplex optical signals $\lambda'_1$–$\lambda'_n$ transmitted from the second opto-electronic device 160 through the transmission fiber 12.

The first end 114 of the transmission fiber 112 is optically connected to the second end 134 of the first optical taper 130, preferably using an optical adhesive, such as a clear epoxy adhesive. The second end 116 of transmission fiber 112 is optically connected to the first end 142 of the second optical fiber taper 140. The second optical fiber taper 140 is similar to the first optical fiber taper 130 and includes the first and second ends 142, 144, with an etched diffraction grating 146 located on the second end 144. The etched diffraction grating 146 is adapted to de-multiplex optical signals $\lambda_1$–$\lambda_n$ which are transmitted through the optical transmission fiber 112 from the first opto-electronic device 120.

In the second preferred embodiment, GRIN lens 150, 152 are located between the first opto-electronic device 120 and the first optical fiber taper 130, as well as between the second end 144 of the second optical fiber taper 140 and the second opto-electronic device 160. A plurality of fibers 122 are preferably located between the emitters 121 of the first opto-electronic device 120 and the GRIN lens 150 for transmitting the optical signals $\lambda_1$–$\lambda_n$ from the emitter 121 to the GRIN lens 150. Preferably, a second plurality of optical fibers 124 are located between the detectors 123 of the first opto-electronic device 120 and the GRIN lens 150 for transmitting the de-multiplexed signals $\lambda'_1$–$\lambda'_n$. These signals are transmitted through the second GRIN lens 152 from the emitters 161 of the second opto-electronic device, the second optical fiber taper 140, the transmission fiber 112 and the first optical fiber taper 130, where they are de-multiplexed by the etched diffraction grating 136 on the first end 132 and focused by the first GRIN lens 150 onto the ends of the second plurality of optical fibers 124. A third plurality of optical fibers 126 is preferably located between the second GRIN lens 152 and the detectors 163 on the second opto-electronic device for transmitting signals from the transmission fiber 112 which are transmitted through the second optical fiber taper 140 and de-multiplexed by the etched diffraction grating 146 on the second end thereof 144 and focused by the second GRIN lens 152 onto the ends of the third plurality of fibers 126 such that they are carried to the detectors 163. A fourth plurality of optical fibers 128 is preferably also utilized for carrying optical signals transmitted by the emitters 161 on the second opto-electronic device to the second GRIN lens 152 where they are focused into the second end 144 of the second optical fiber taper 140.

Utilizing the systems in accordance with the present invention, it is possible to transmit multiplexed optical signals through a single optical transmission fiber 12, 112 with the de-multiplexing taking place by etched diffraction gratings 46, 136, 146. Preferably, the etched diffraction gratings are formed using photolithographic techniques to create a mask on the end surface of the optic fiber tapers prior to etching the end surface, such as utilizing a fluoric acid etch, in order to form the gratings. The diffraction gratings are utilized to de-multiplex the optical signals which are transmitted at different wave lengths $\lambda_1$–$\lambda_n$, $\lambda'_1$–$\lambda'_n$. By forming the diffraction gratings on the ends of the taper 30, 130, 140, additional signal losses associated with added connections utilized in more complex de-multiplexing systems are avoided.

While the preferred embodiments of the invention have been described in detail, the invention is not limited to the specific embodiments described above, which should be considered as merely exemplary. Further modifications and extensions of the present invention may be developed based upon the foregoing, and all such modifications are deemed to be within the scope of the present invention as defined by the appended claims.

What is claimed is:

1. A fiber based wavelength de-multiplexing system comprising:

an optical fiber with a first end and a second end, the first end adapted to receive multiplexed signals;

an optical fiber taper with a first end and a second end, the first end of the optical fiber taper having a smaller area than an area of the second end of the optical fiber taper;

the first end of the optical fiber optically connected to an optical signal emitting device, the second end of the optical fiber optically connected to the first end of the tapered optical fiber; and an etched diffraction grating located on the second end of the optical fiber taper adapted to de-multiplex optical signals transmitted through the optical fiber.

2. A fiber based wavelength de-multiplexing system of claim 1 further comprising:

a GRIN lens optically connected to the second end of the optical fiber taper adapted to transmit de-multiplexed optical signals from the etched diffraction grating to detectors.

3. A fiber based wave de-multiplexing system of claim 2 further comprising:

a plurality of fibers optically connected to the GRIN lens, adapted to receive optical signals from the lens, the GRIN lens adapted to direct one de-multiplexed signal into each of the plurality of fibers.

4. A fiber based wavelength de-multiplexing system comprising:

a first optical fiber taper having a first end and a second end, the first end having an area greater than an area of the second end;

a first etched diffraction grating located on the first end of the first optical fiber taper adapted to demultiplex optical signals transmitted from the transmission fiber;

an optical signal emitting device adapted to emit optical signals of different wavelengths optically connected to the first end of the optical fiber taper;

a transmission fiber having a first end and a second end, the first end of the transmission fiber optically connected to the second end of the first optical fiber taper;

a second optical fiber taper having a first end and a second end, the second end of the second optical fiber taper having an area greater than an area of the first end of the second optical fiber taper;

the second end of the transmission fiber optically connected to the first end of the second optical fiber taper; and a second etched diffraction grating located on the second end of the second optical fiber taper adapted to de-multiplex optical signals transmitted from the transmission fiber.

5. A fiber based wavelength de-multiplexing system according to claim 4, wherein the optical signal emitting device comprises at least one Vertical Cavity Surface Emitting Laser array.

6. A fiber based wavelength de-multiplexing system according to claim 4 wherein the optical signal emitting device comprises at least one Light Emitting Diode.

7. The fiber based wavelength de-multiplexing system of claim 4 further comprising:

at least one GRIN lens adapted to transmit de-multiplexed optical signals from at least one of the first and second etched diffraction gratings optically connected to at least one of the first and second etched diffraction gratings; and a plurality of fibers adapted to receive optical signals from the at least one GRIN lens, the plurality of fibers optically connected to the GRIN lens, the GRIN lens transmitting a de-multiplexed signal into each of the plurality of fibers.

8. A bi-directional method of de-multiplexing optical signals comprising:

providing a first optical fiber taper with a first end and second smaller diameter end;

providing a transmission fiber with a first and second end;

providing a second optical fiber taper with a first smaller diameter end and a second end, the second end having an etched diffraction grating;

optically connecting the second end of the first optical fiber taper to the first end of the transmission fiber;

optically connecting the first end of the second optical fiber taper to the second end of the transmission fiber;

emitting optical signals of different wavelengths from an optical signal emitter;

multiplexing the optical signals received from the optical signal emitter;

transmitting the multiplexed signals of different wavelengths from the optical signal emitter through the first optical fiber taper, the transmission fiber, and the second optical fiber taper to the etched diffraction grating on the second taper; and de-multiplexing the multiplexed optical signals through the second etched diffraction grating.

9. The method of claim 8 further comprising:

optically connecting a GRIN lens to the second end of the second optical fiber taper and transmitting optical signals to a plurality of fibers optically connected to the GRIN lens.

10. A method of de-multiplexing optical signals of claim 8 further comprising:

providing an etched diffraction grating on the first end of the first taper;

transmitting optical signals of different wave lengths through the second taper into the transmission fiber and through the first taper;

de-multiplexing the optical signals with the etched diffraction grating on the first end of the first fiber.

11. The method of claim 8 further comprising:

optically connecting a GRIN lens to the second end of the second optical fiber taper and transmitting optical signals to a plurality of fibers optically connected to the first GRIN lens.

12. The method of claim 9 further comprising:

providing a second GRIN lens to the first end of the first optical fiber taper; and transmitting the optical signals to a second plurality of fibers.

* * * * *